(12) United States Patent
Kunz et al.

(10) Patent No.: US 10,904,740 B2
(45) Date of Patent: Jan. 26, 2021

(54) METHOD OF INBOUND ROAMER DETECTION FOR NETWORKS SUPPORTING SERVICE DOMAIN CENTRALIZATION IN IMS

(71) Applicant: NEC Corporation, Tokyo (JP)

(72) Inventors: Andreas Kunz, Heidelberg (DE); Naoaki Suzuki, Tokyo (JP); Anand Raghawa Prasad, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/468,378

(22) PCT Filed: Dec. 18, 2017

(86) PCT No.: PCT/JP2017/045396
§ 371 (c)(1),
(2) Date: Jun. 11, 2019

(87) PCT Pub. No.: WO2018/117054
PCT Pub. Date: Jun. 28, 2018

(65) Prior Publication Data
US 2020/0015067 A1 Jan. 9, 2020

(30) Foreign Application Priority Data
Dec. 21, 2016 (EP) .................... 16275177

(51) Int. Cl.
*H04W 8/18* (2009.01)
*H04L 29/06* (2006.01)
(Continued)

(52) U.S. Cl.
CPC ......... *H04W 8/18* (2013.01); *H04L 29/06217* (2013.01); *H04L 65/1016* (2013.01);
(Continued)

(58) Field of Classification Search
CPC .......... H04W 8/18; H04W 8/06; H04W 8/12; H04W 8/10; H04W 8/04; H04W 60/005;
(Continued)

(56) References Cited

U.S. PATENT DOCUMENTS

| 9,060,263 B1 | 6/2015 | Carames et al. |
| 2009/0093249 A1* | 4/2009 | Zhu ..................... H04L 65/1073 455/433 |

(Continued)

FOREIGN PATENT DOCUMENTS

JP    2012-526454 A1    10/2012

OTHER PUBLICATIONS

Vikas Bajaj, "Roaming Between GSM/UMTS and IMS Networks", 2008 3rd International Conference on Communication Systems Software and Middleware and Workshops (COMSWARE '08), Bangalore, 2008, pp. 488-494, doi: 10.1109/COMSWA.2008. 4554462 (Year: 2008).*

(Continued)

*Primary Examiner* — Joshua Kading
(74) *Attorney, Agent, or Firm* — Finnegan, Henderson, Farabow, Garrett & Dunner, L.L.P.

(57) ABSTRACT

Embodiments of this disclosure enable the I-CSCF and S-CSCF to detect inbound roaming UEs to network supporting Service Domain Centralization in IMS, so that the S-CSCF is able to select the appropriate database entity and can understand the CS authentication vector.

6 Claims, 12 Drawing Sheets

(51) Int. Cl.
  *H04W 8/06* (2009.01)
  *H04W 8/12* (2009.01)
  *H04W 60/00* (2009.01)
  *H04W 8/10* (2009.01)
  *H04W 4/50* (2018.01)
  *H04W 48/18* (2009.01)
  *H04W 48/04* (2009.01)
  *H04W 60/04* (2009.01)
  *H04W 8/04* (2009.01)
  *H04W 48/16* (2009.01)

(52) U.S. Cl.
  CPC ........... *H04L 65/1073* (2013.01); *H04W 4/50* (2018.02); *H04W 8/04* (2013.01); *H04W 8/06* (2013.01); *H04W 8/10* (2013.01); *H04W 8/12* (2013.01); *H04W 48/04* (2013.01); *H04W 48/16* (2013.01); *H04W 48/18* (2013.01); *H04W 60/005* (2013.01); *H04W 60/04* (2013.01)

(58) Field of Classification Search
  CPC ..... H04W 60/04; H04W 48/04; H04W 48/16; H04W 48/18; H04W 4/50; H04W 76/16; H04W 12/06; H04W 12/08; H04L 29/06217; H04L 65/1016; H04L 65/1073
  See application file for complete search history.

(56) References Cited

U.S. PATENT DOCUMENTS

2010/0199330 A1* 8/2010 Schott ................. H04L 65/1073
                                                                726/4
2010/0290403 A1* 11/2010 Lindholm ........... H04L 65/1069
                                                                370/328
2015/0173123 A1* 6/2015 Luessem ............... H04W 76/36
                                                                370/328

OTHER PUBLICATIONS

International Search Report dated Feb. 20, 2018, in corresponding PCT International Application.
3GPP TS 23.228 V14.1.0 (Sep. 2016), "3$^{rd}$ Generation Partnership Project; Technical Specification Group Services and System Aspects; IP Multimedia Subsystem (IMS), Stage 2, (Release 14)", pp. 1-317, (Sep. 2016).
3GPP TS 23.292 V14.0.0 (Sep. 2016), "3$^{rd}$ Generation Partnership Project; Technical Specification Group Services and System Aspects; IP Multimedia Subsystem (IMS) Centralized Services, Stage 2, (Release 14)", pp. 1-137, (Sep. 2016).
3GPP TS 23.003 V14.1.0 (Sep. 2016), "3$^{rd}$ Generation Partnership Project; Technical Specification Group Core Network and Terminals; Numbering, Addressing and Identification, (Release 14)", pp. 1-103, (Sep. 2016).
3GPP TS 23.292 V14.1.0 (Sep. 2016), "3$^{rd}$ Generation Partnership Project; Technical Specification Group Services and System Aspects; IP Multimedia Subsystem (IMS) Centralized Services, Stage 2, (Release 14)", pp. 1-137, (Sep. 2016).
Dorgham Sisalem et al.; "Introduction to IMS", SIP Security, XP055449212, pp. 93-122, (2009).
3GPP TWG SA WG 2 Meeting 119, S2-171245, Inbound Roamer Detection at I/S-CSCF, pp. 1-5 (2017).
Japanese Office Action of the counterpart Japanese Patent Application No. 2019-530855 dated Aug. 19, 2020.

* cited by examiner

[Fig. 1]
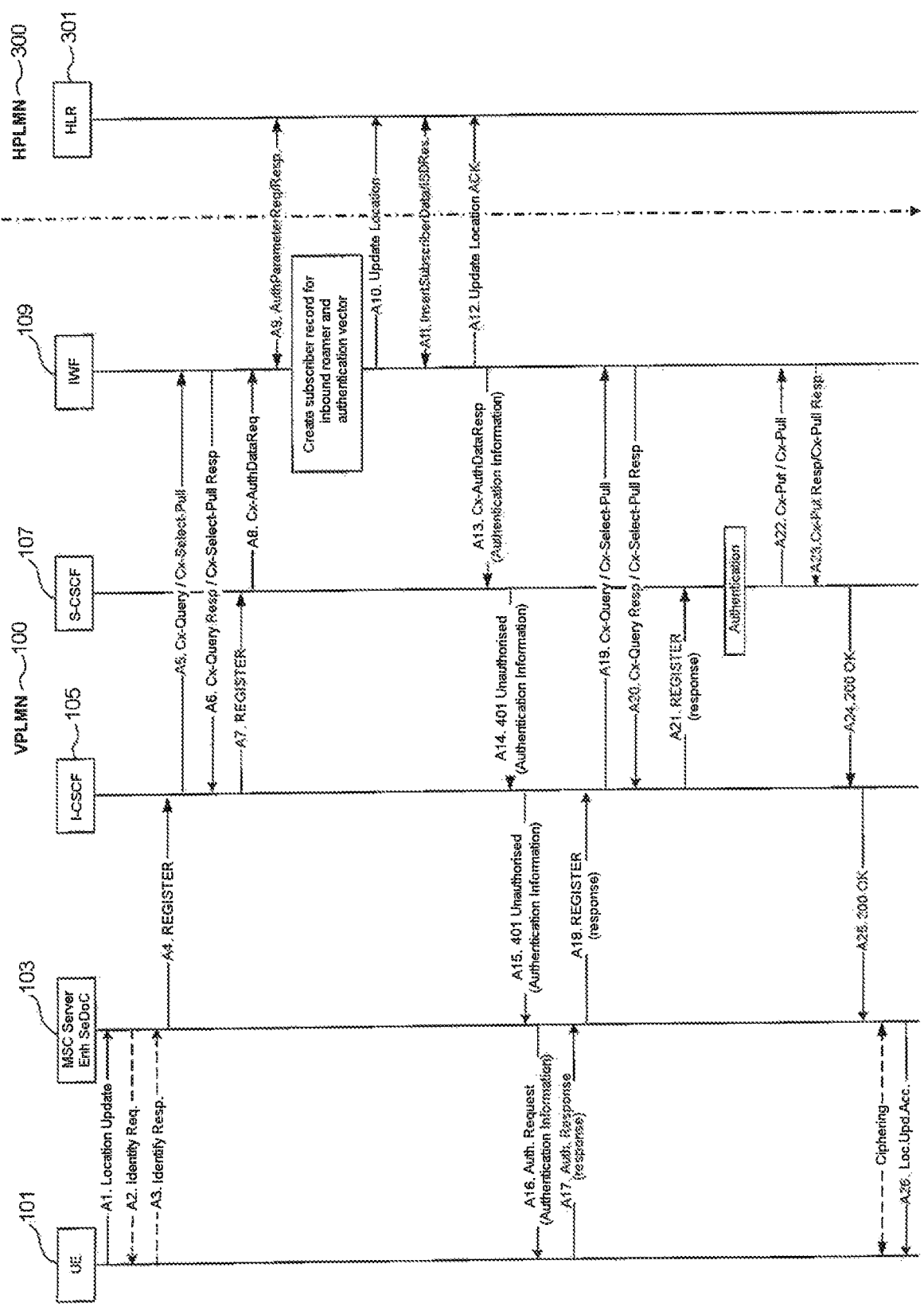

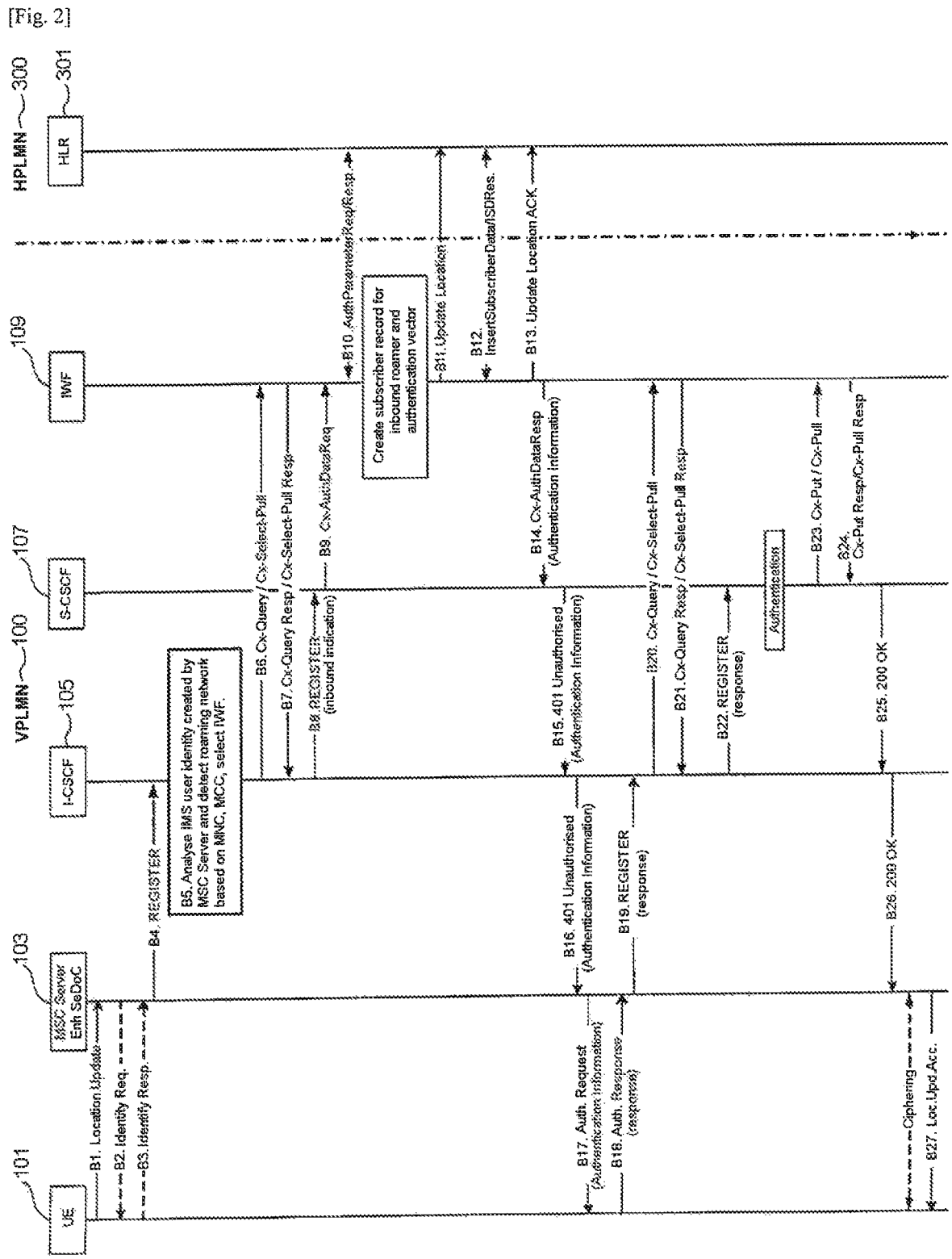
[Fig. 2]

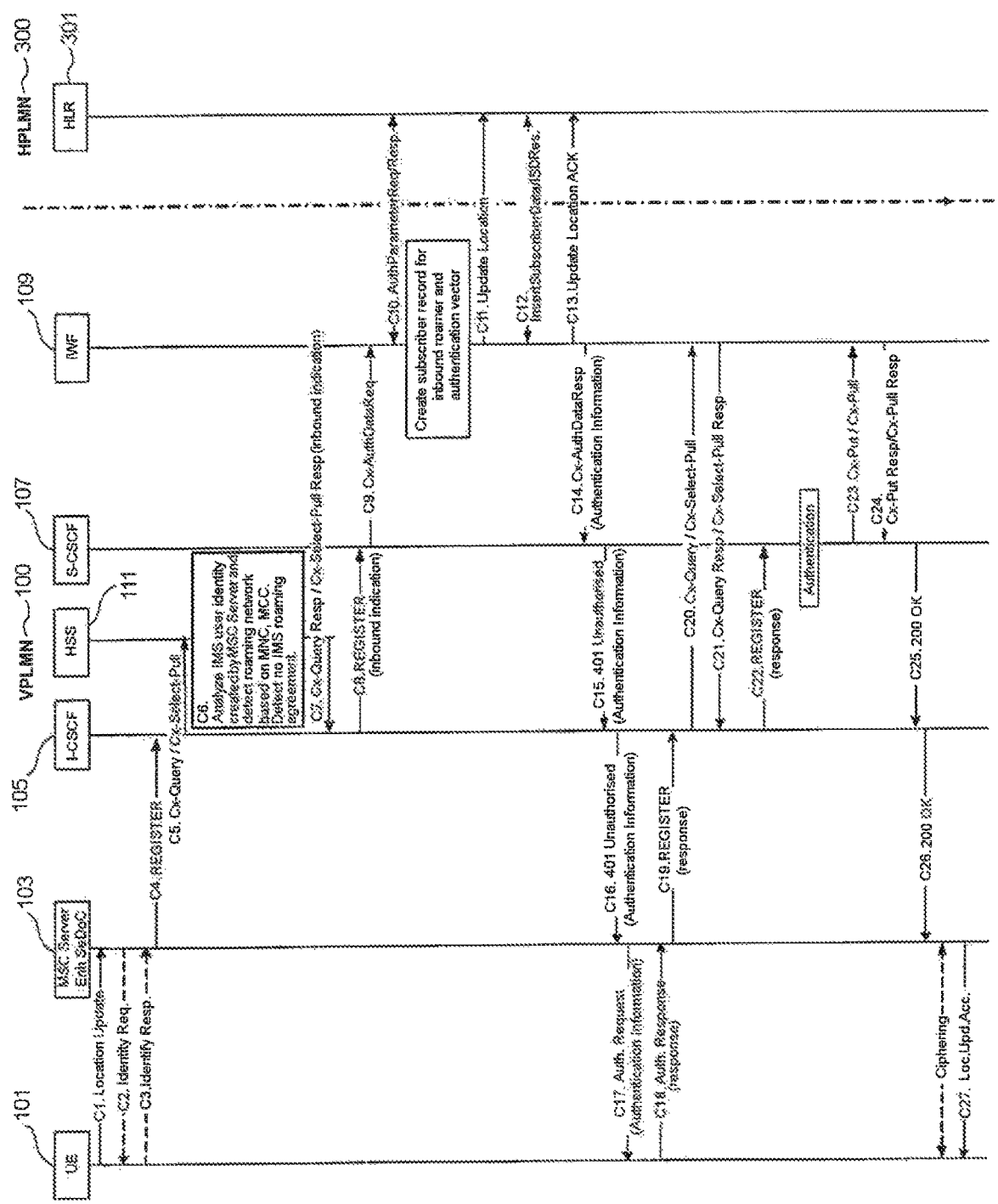
[Fig. 3]

[Fig. 4]
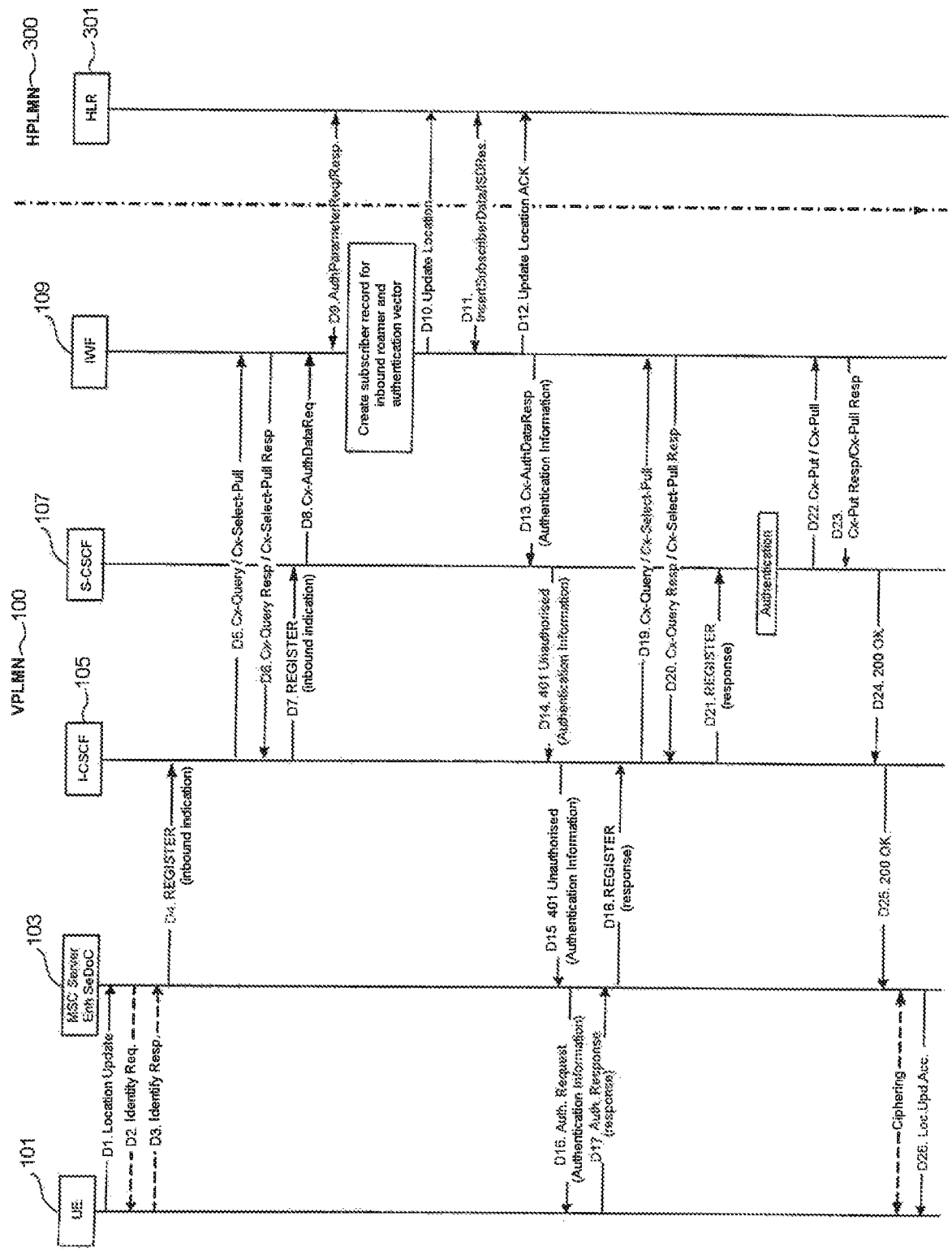

[Fig. 5]
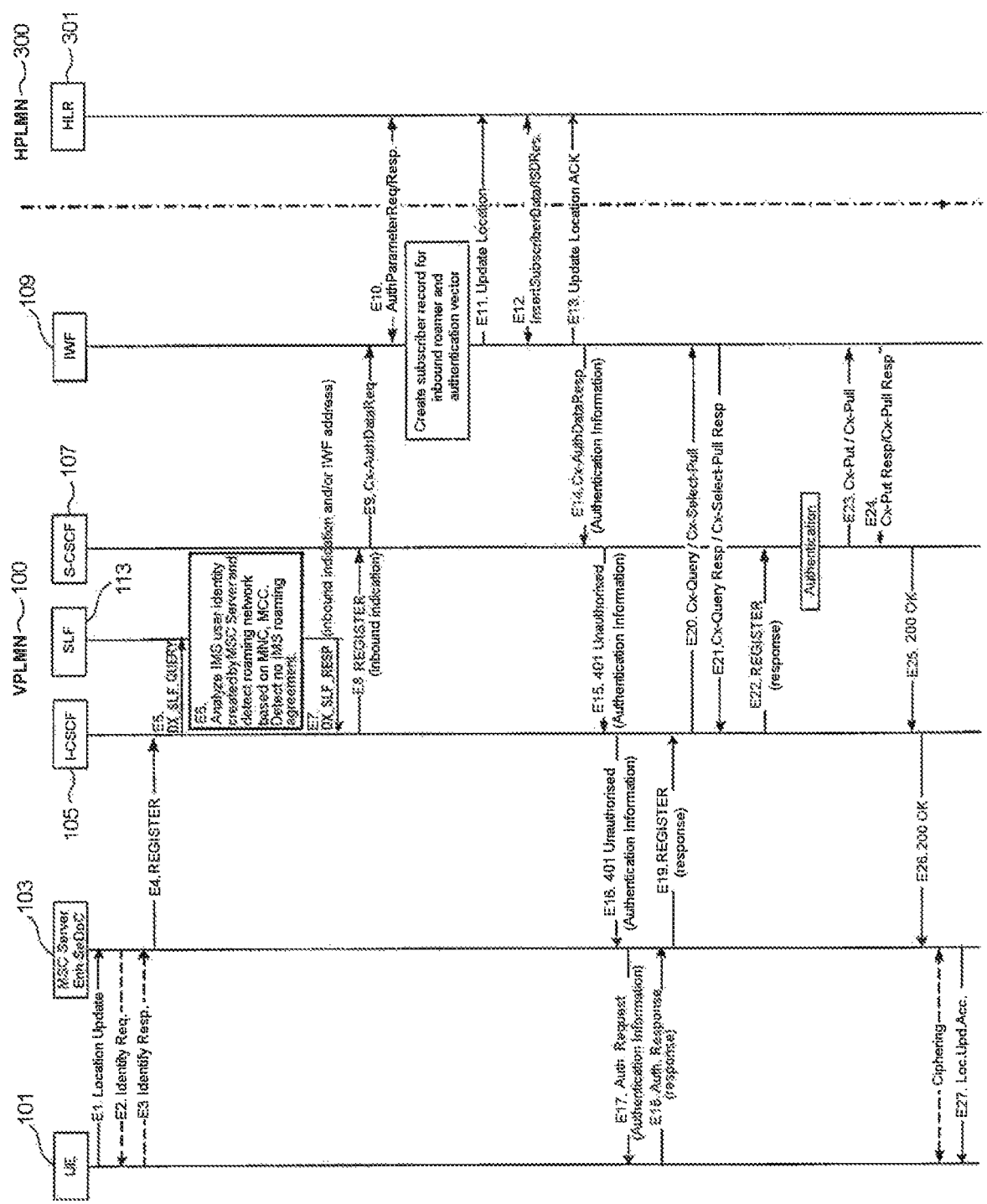

[Fig. 6]
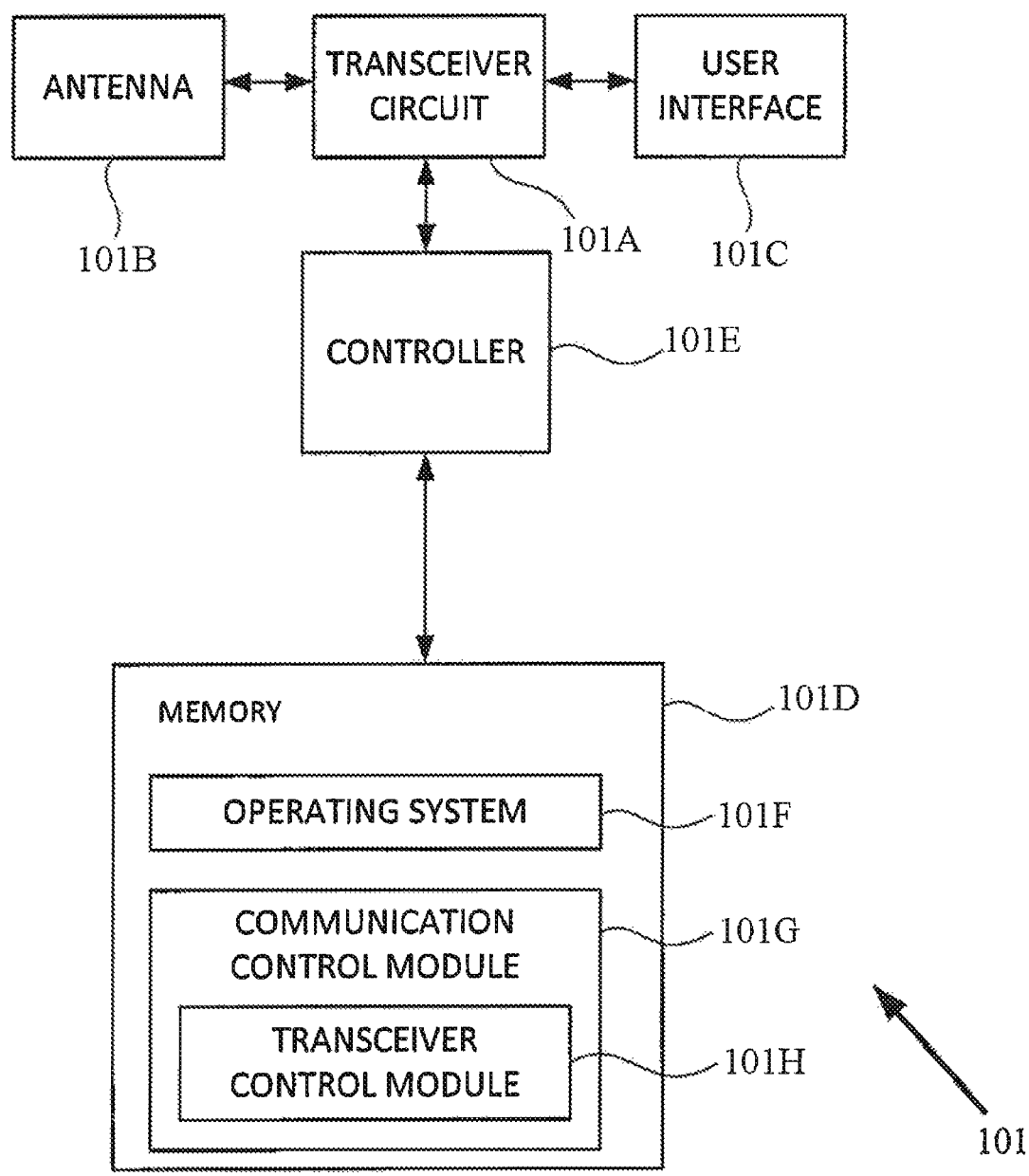

[Fig. 7]
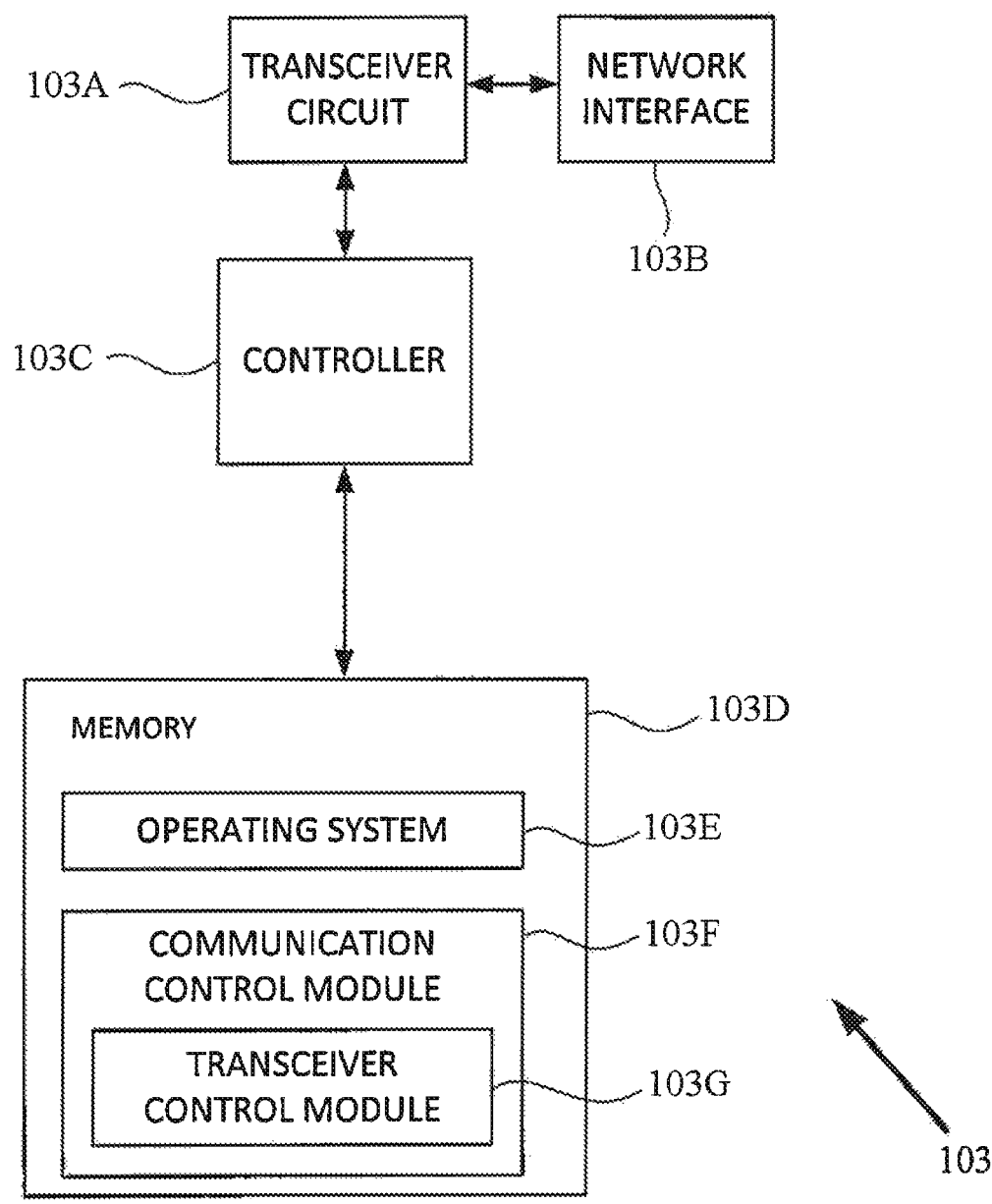

[Fig. 8]
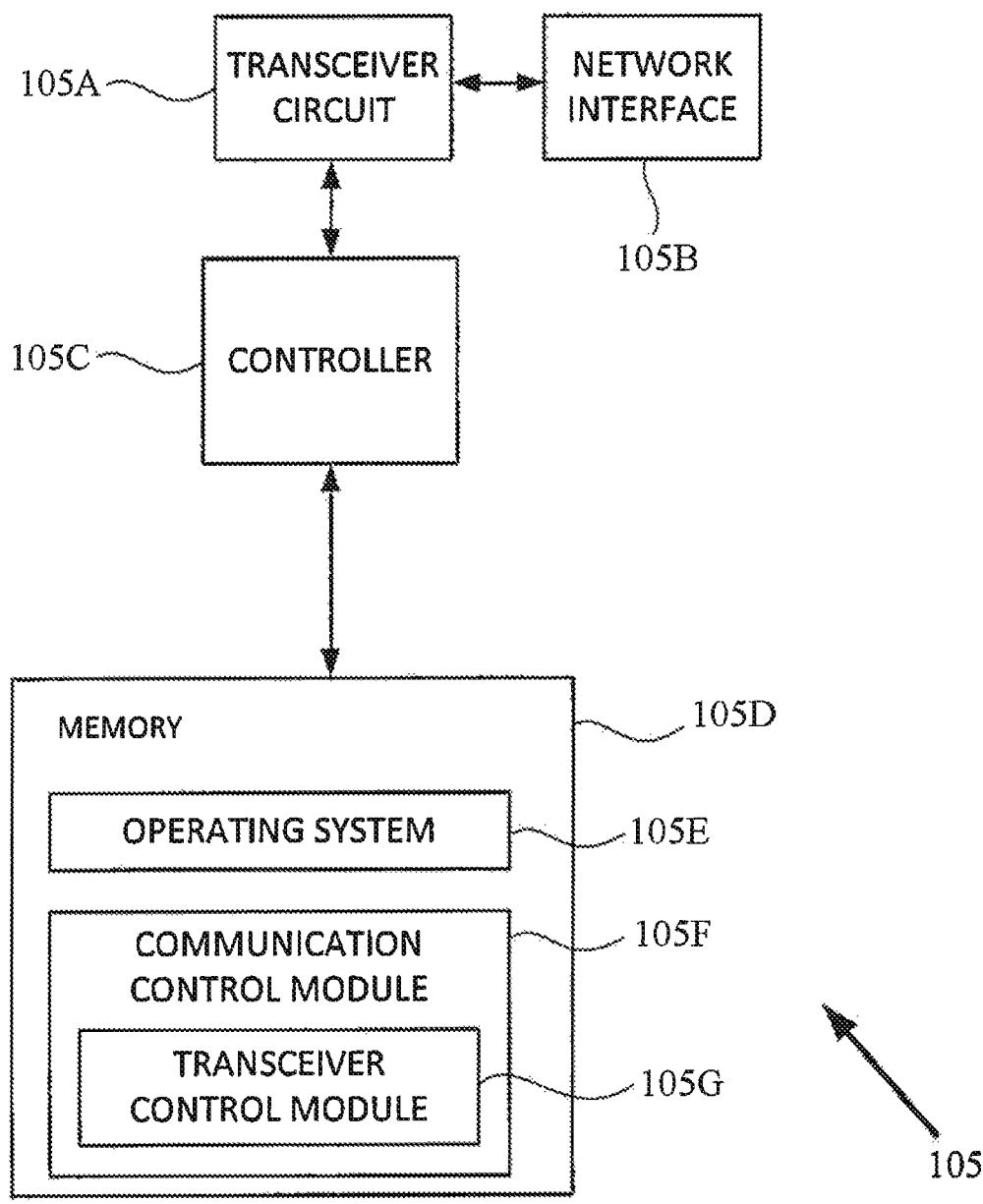

[Fig. 9]
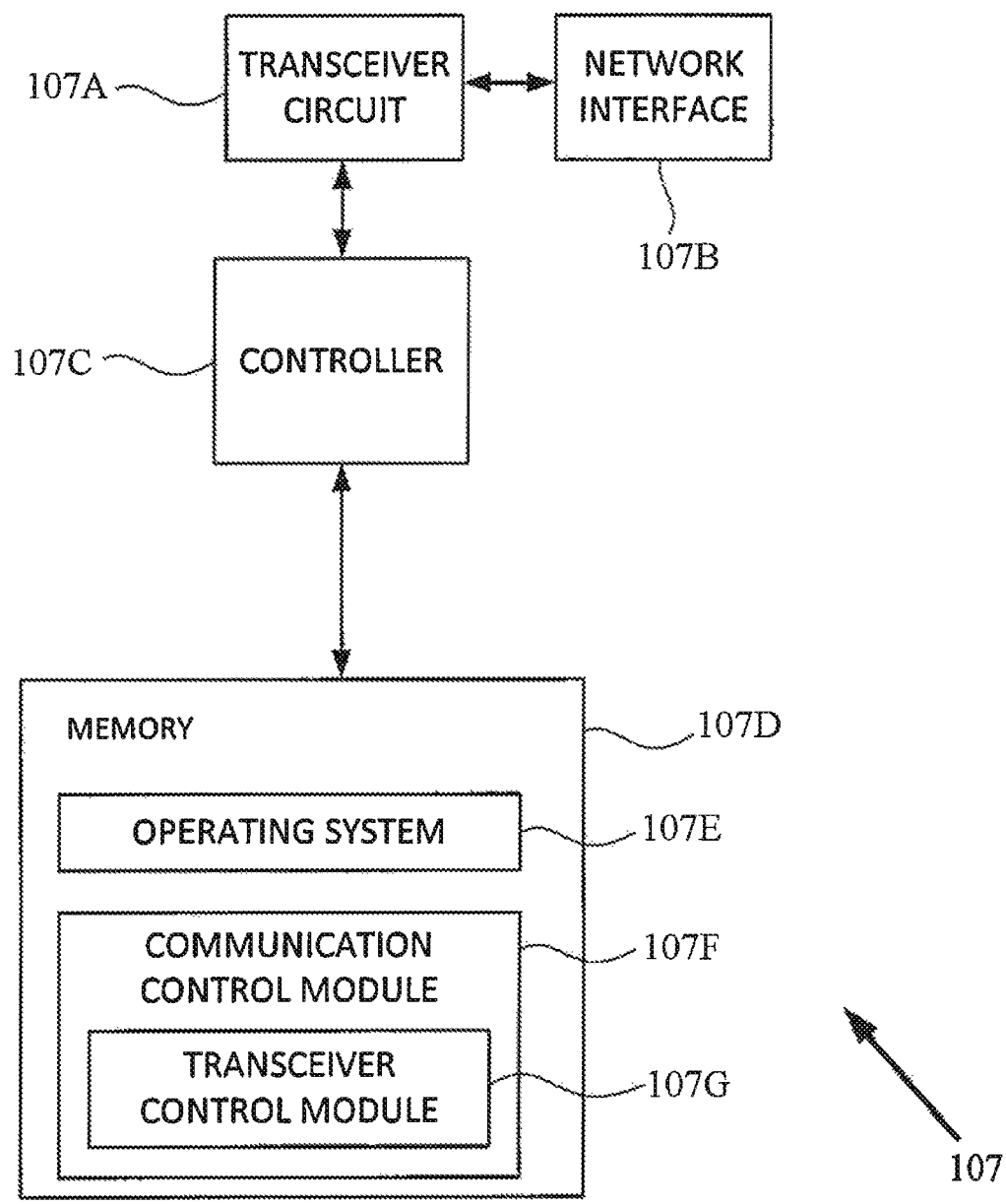

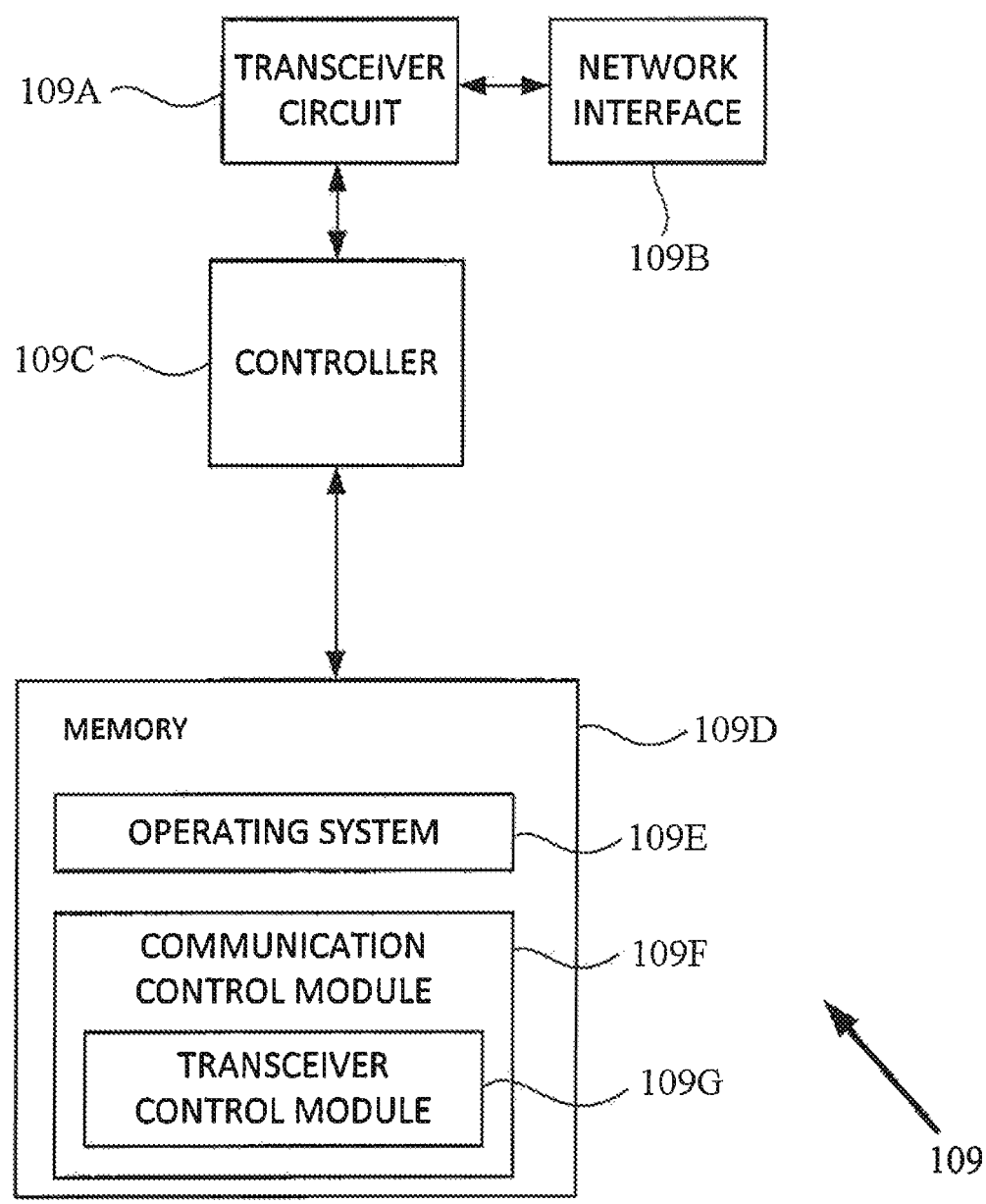

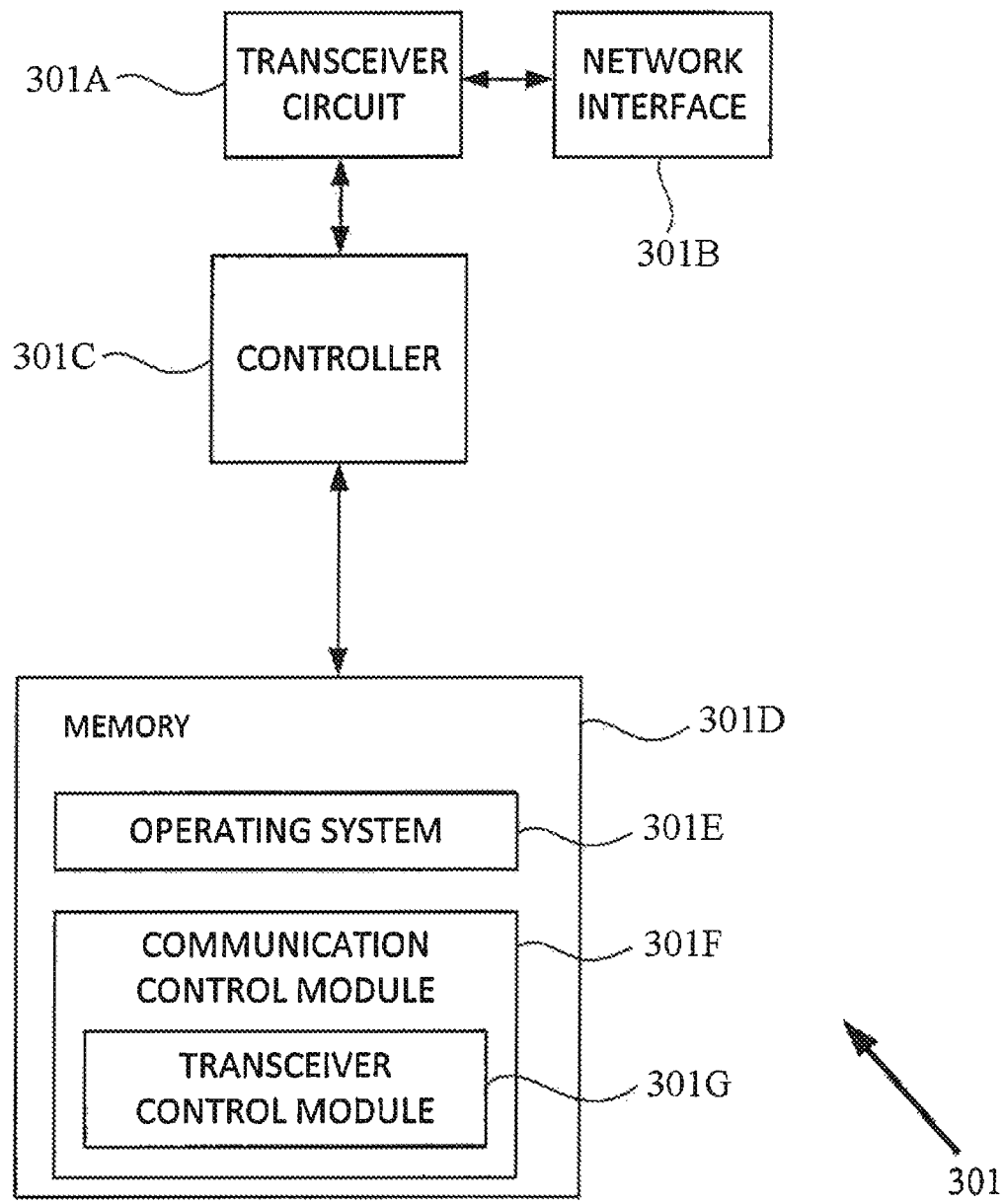

[Fig. 12]
General block diagram for RAN node
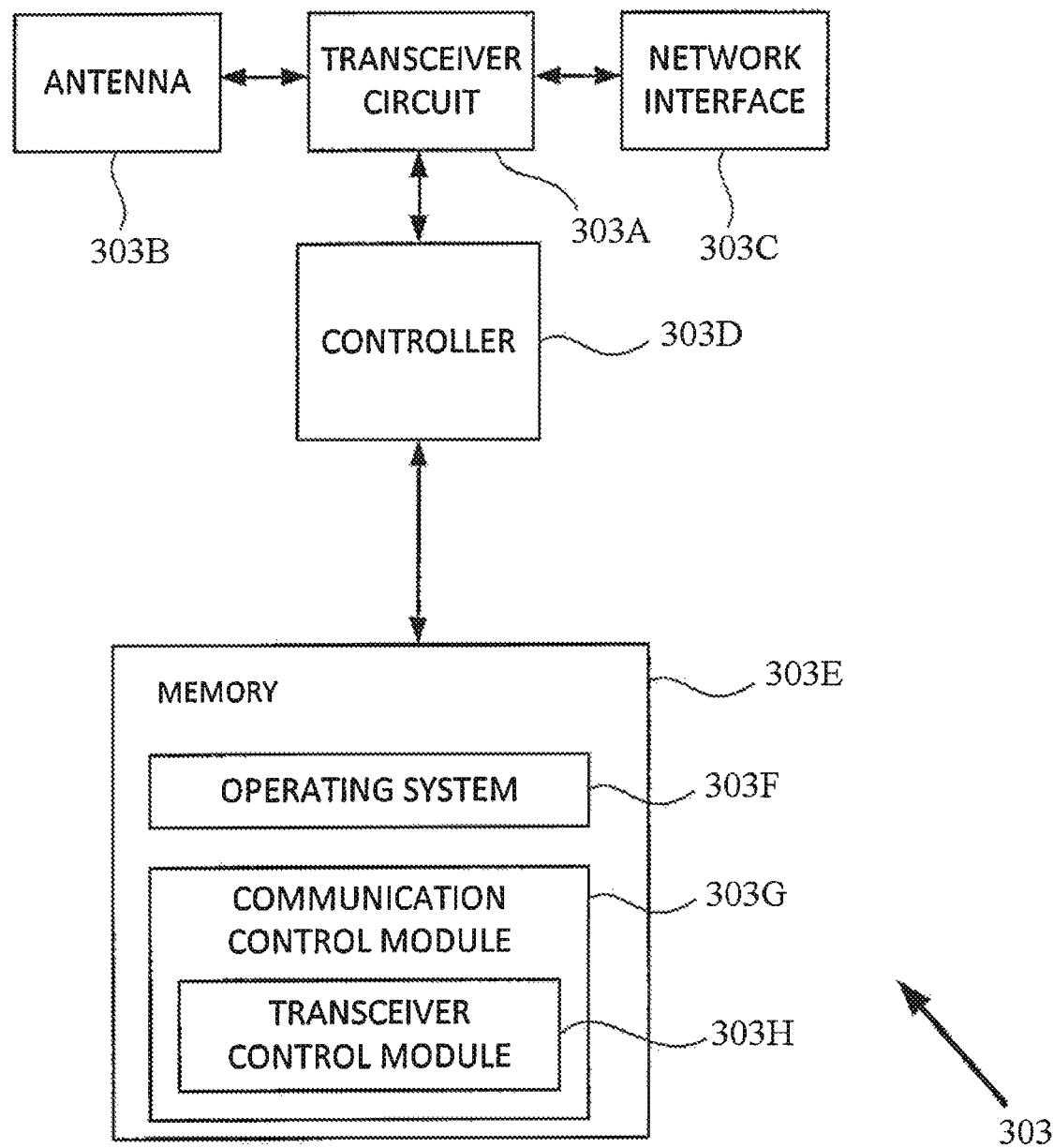

METHOD OF INBOUND ROAMER DETECTION FOR NETWORKS SUPPORTING SERVICE DOMAIN CENTRALIZATION IN IMS

CROSS-REFERENCE TO RELATED PATENT APPLICATIONS

This application is a National Stage Entry of International Application No. PCT/JP2017/045396, filed Dec. 18, 2017, which claims priority from European Patent Application No. 16275177.0, filed Dec. 21, 2016. The entire contents of the above-referenced applications are expressly incorporated herein by reference.

TECHNICAL FIELD

The present disclosure relates to inbound roamer detection for networks supporting service domain centralization in IMS.

BACKGROUND ART

List of Abbreviations

The following abbreviations in Tables 1 and 2 are used in the current specification:

TABLE 1

| | |
|---|---|
| API | Application Programming Interface |
| AS | Application Server |
| AVP | Attribute Value Pair |
| CCA | Credit-Control-Answer |
| CS | Circuit Switched |
| CSCF | Call Session Control Function |
| eNB | Evolved NodeB |
| GPRS | General Packet Radio Service |
| HLR | Home Location Register |
| HO | Handover |
| HPLMN | Home Public Land Mobile Network |
| HSS | Home Subscriber Server |
| IBCF | Interconnection Border Control Function |
| ICS | IMS Centralized Services |
| I-CSCF | Interrogated Call Session Control Function |
| iFC | Initial Filter Criteria |
| IMPI | IP Multimedia Private User Identity |
| IMPU | IP Multimedia Public User Identity |
| IMS | IP Multimedia Subsystem |
| IMSI | International Mobile Subscriber Identifier |
| IP | Internet Protocol |
| IWF | Interworking Function |
| LAI | Location Area Identifier |
| LAU | Location Area Update |
| LBO | Local Breakout |
| LTE | Long Term Evolution |
| MAA | Multimedia-Auth-Answer |
| MAP | Mobile Application Part |
| MAR | Multimedia-Auth-Request |
| MCC | Mobile Country Code |
| MGW | Media Gateway |

TABLE 2

| | |
|---|---|
| MME | Mobility Management Entity |
| MSC | Mobile Switching Centre |
| MNC | Mobility Network Code |
| MSC-S | MSC-Server |
| MSRN | Mobile Station Routing Number |
| NW | Network |
| PCEF | Policy Control Enforcement Function |
| PCRF | Policy Control Rule Function |
| P-CSCF | Proxy Call Session Control Function |

TABLE 2-continued

| | |
|---|---|
| PDN | Packet Data Network |
| PGW | PDN Gateway |
| PSAP | Public Safety Answering Point |
| QoS | Quality of Service |
| RAND | RANDom number (used for authentication) |
| RAR | Re-Auth-Request |
| SAA | Server-Assignment Answer |
| SAR | Server-Assignment-Request |
| S-CSCF | Serving Call Session Control Function |
| SGSN | Serving GPRS Support Node |
| SGW | Serving Gateway |
| SIP | Session Initiation Protocol |
| SRES | Signed RESponse (authentication value returned by the SIM or by the USIM in 2G AKA) |
| TAS | Telephony Application Server |
| UDA | User Data Answer |
| UDR | User Data Request |
| UE | User Equipment |
| URI | Uniform Resource Identifier |
| URN | Uniform Resource Name |
| VLR | Visited Location Register |
| VoLTE | Voice over LTE |
| VPLMN | Visited Public Land Mobile Network |

Current specifications TS 23.292 [2] describe the extension of ICS in the Annex G (normative): "Combined CS Access Authentication and IMS Registration Procedure for non-roaming UEs" for the authentication and in the Annex H (informative): "Service Domain Centralization in IMS (SeDoC)" as the overall concept. The feature is built on the following assumptions that all MSC Servers are enhanced with the ICS feature and do not host a local VLR, nor have any MAP connection to each other.

Inbound roamers from networks without any IMS subscription or IMS capabilities are connected via legacy CS to the MSC server in the SeDoC network where they are hosted with a temporary IMS identity in the serving SeDoC IMS network. The treatment in the inbound roaming IMS network is different for the inbound roamers and for the own subscribers of that network.

Currently it is not clear how the I-CSCF and the S-CSCF can differentiate the inbound roamers from the normal subscribers in order to select the appropriate entity (ICS-IWF or HSS) and in order to understand the format of the authentication vector, since the CS and the IMS authentication vector are similar as such but the IMS RES is not sent in the clear but combined with other parameters to form an authentication response. For this reason, e.g. in case that only a limited number of S-CSCF in the network support the CS authentication for inbound roamer it is also important that the right S-CSCF is selected.

SUMMARY OF INVENTION

Technical Problem

FIG. 1, which corresponds to FIG. H.5.2.3.1-1: "Authentication/Registration procedure for inbound roamer" of TS 23,292, is showing the described issues in Step A5, A8 and after Step A17.

This document proposes different embodiments to indicate or provide the I-CSCF and the S-CSCF with the relevant information about the subscriber status for allowing them to take the appropriate decision.

Solution to Problem

As one aspect of the present disclosure, a control node for interrogating for call session control, comprising: a receiver configured to receive a register message with at least one of an IP (Internet Protocol) Multimedia Private Identity (IMPI) and an IP Multimedia Public Identity (IMPU) of a User Equipment (UE) from a Mobile Switching Centre (MSC) server enhanced for Service Domain Centralization in IP Multimedia Subsystem (IMS) (SeDoC); detecting means configured to detect whether the UE is an inbound roaming UE, based on a comparison of a Mobile Network Code (MNC) and a Mobile Country Code (MCC) included in the at least one of the IMPI and the IMPU; and selecting means configured to select an apparatus for proceeding a procedure based on detection of the inbound roaming UE is provided.

As another aspect of the present disclosure, a network entity for IP (Internet Protocol) Multimedia Subsystem (IMS) Centralized Services (ICS), comprising: a receiver configured to receive from an Interrogating Call Session Control Function (I-CSCF) entity, a query whether an operator network indicated by a Mobile Network Code (MNC) and a Mobile Country Code (MCC) included in at least one of an IP (Internet Protocol) Multimedia Private Identity (IMPI) and an IP Multimedia Public Identity (IMPU) within a registration message received by the I-CSCF entity has an IMS roaming agreement or a Service Level Agreement (SLA) place with a network including the network entity; selecting means configured to select a Serving Call Session Control Function (S-CSCF) entity which handles Circuit Switched (CS) authentication procedure in a case that there is neither the IMS roaming agreement nor the SLA; and providing means configured to provide an address of the S-CSCF entity to the 1-CSCF entity is provided.

As another aspect of the present disclosure, a communication system for IP (Internet Protocol) Multimedia Subsystem (IMS) Centralized Services (ICS), comprising: a control node for interrogating for call session control and a network entity for the ICS, wherein the control node includes: a receiver configured to receive a register message including at least one of an IP Multimedia Private Identity (IMPI) and an IP Multimedia Public Identity (IMPU) of a User Equipment (UE) from a Mobile Switching Centre (MSC) server enhanced for Service Domain Centralization in IP Multimedia Subsystem (SeDoC); detecting means configured to detect whether the UE is an inbound roaming UE, based on a comparison of a Mobile Network Code (MNC) and a Mobile Country Code (MCC) included in the at least one of the IMPI and the IMPU; and transmitting means configured to transmit a query whether an operator network indicated by the MNC and the MCC has an IMS roaming agreement or a Service Level Agreement (SLA) in place with a network including the network entity, based on detection of the inbound roaming UE, and the network entity includes: a receiver configured to receive the query from the control node; selecting means configured to select a Serving Call Session Control Function (S-CSCF) entity which handles Circuit Switched (CS) authentication procedure in a case that there is neither the IMS roaming agreement nor the SLA; and providing means configured to provide an address of the S-CSCF entity to the control node is provided.

As another aspect of the present disclosure, a controlling method for interrogating for call session control, comprising: receiving a register message with at least one of an IP (Internet Protocol) Multimedia Private Identity (IMPI) and an IP Multimedia Public Identity (IMPU) of a User Equipment (UE) from a Mobile Switching Centre (MSC) server enhanced for Service Domain Centralization in IP Multimedia Subsystem (IMS) (SeDoC); detecting whether the UE is an inbound roaming UE, based on a comparison of a Mobile Network Code (MNC) and a Mobile Country Code (MCC) included in the at least one of the IMPI and the IMPU; and selecting an apparatus for proceeding a procedure based on detection of the inbound roaming UE is provided.

As another aspect of the present disclosure, a controlling method for IP Multimedia Subsystem (IMS) Centralized Services (ICS), comprising: receiving from an Interrogating Call Session Control Function (I-CSCF) entity, a query whether an operator network indicated by a Mobile Network Code (MNC) and a Mobile Country Code (MCC) included in at least one of an IP (Internet Protocol) Multimedia Private identity (IMPI) and an IP Multimedia Public Identity (IMPU) within a registration message received by the 1-CSCF entity has an IMS roaming agreement or a Service Level Agreement (SLA) in place with a network including the network entity; and selecting a Serving Call Session Control Function (S-CSCF) entity which handles Circuit Switched (CS) authentication procedure in a case that there is neither the IMS roaming agreement nor the SLA; and providing an address of the S-CSCF entity to the I-CSCF entity is provided.

As another aspect of the present disclosure, a controlling method for IP (Internet Protocol) Multimedia Subsystem (IMS) Centralized Services (ICS) used in a communication system including a control node for interrogating for call session control and a network entity for the ICS, comprising: receiving, by the control node, a register message including at least one of an IP Multimedia Private identity (IMPI) and an IP Multimedia Public Identity (IMPU) of a User Equipment (UE) from a Mobile Switching Centre (MSC) server enhanced for Service Domain Centralization in IP Multimedia Subsystem (SeDoC); detecting whether the UE is an inbound roaming UE, based on a comparison of a Mobile Network Code (MNC) and a Mobile Country Code (MCC) included in the at least one of the IMPI and the IMPU; transmitting, by the control node, a query whether an operator network indicated by the MIC and the MCC has an IMS roaming agreement or a Service Level Agreement (SLA) in place with a network including the network entity, based on detection of the inbound roaming UE; receiving, by the network entity, the query from the control node; selecting, by the network entity, a Serving Call Session Control Function (S-CSCF) entity which handles Circuit Switched (CS) authentication procedure in a case that there is neither the IMS roaming agreement nor the SLA; and providing, by the network entity, an address of the S-CSCF entity to the control node is provided.

BRIEF DESCRIPTION OF DRAWINGS

FIG. 1 is FIG. H.5,2,3.1-1: Authentication/Registration procedure for inbound roamer of TS 23.292.

FIG. 2 shows inbound roamer detection and marking in I-CSCF of the embodiment #1a of the present disclosure.

FIG. 3 shows inbound roamer detection and marking in HSS of the embodiment #1b of the present disclosure.

FIG. 4 shows explicit inbound roamer indication in SIP REGISTER message of the embodiment #2 of the present disclosure.

FIG. 5 shows inbound roamer detection based on SLF query of the embodiment #3 of the present disclosure.

FIG. 6 is a block diagram illustrating the main components of a UE 101 of the present disclosure.

FIG. 7 is a block diagram illustrating the main components of an MSC Server 103 of the present disclosure.

FIG. 8 is a block diagram illustrating the main components of an I-CSCF 105 of the present disclosure.

FIG. 9 is a block diagram illustrating the main components of an S-CSCF 107 of the present disclosure.

FIG. 10 is a block diagram illustrating the main components of an IWF 109 of the present disclosure.

FIG. 11 is a block diagram illustrating the main components of an HLR 301 of the present disclosure.

FIG. 12 is a block diagram illustrating the main components of a Radio Access Network (RAN) node 303 of the present disclosure.

DESCRIPTION OF EMBODIMENTS

Embodiment #1: Implicit Inbound Roamer Indication Based on IMPI/IMPU Coding

According to TS 23.003 [3], the ICS MSC Server shall generate the Private User Identity of the firm "<IMSI>@ics.mnc<MNC>.mcc<MCC>.3gppnetwork.org". The MSC Server enhanced for ICS shall derive the Public User Identity from the subscriber's IMSI similar to the Private User Identity.

The following nodes I-CSCF, HSS, or S-CSCF need to be enhanced to resolve whether there is an IMS roaming agreement with the operator of the code MNC/MCC or not.

Embodiment #1a: Inbound Roamer Detection and Marking in I-CSCF

This embodiment consists of two variations, one where the I-CSCF 105 detects the inbound roaming UE 101, the IMS roaming agreement with the HPLMN 300 of the inbound roamer as well as the S-CSCF 107 selection which support CS authentication in IMS.

The MSC server enhanced for SeDoC 103 sends a normal SIP REGISTER message with the IMPU/IMPI generated as described above according to TS 23.003. The I-CSCF 105 detects the inbound roaming UE 101 based on a comparison of the MNC/MCC in the IMPI/IMPU. In one variant, the I-CSCF 105 may look up a database whether the MNC/MCC operator network (HPLMN 300 of the inbound roaming UE 101) has an IMS roaming agreement or not. If there is no IMS roaming agreement or any other related Service Level Agreements (SLA) in place with this network, then the I-CSCF 105 marks the SIP REGISTER and selects an S-CSCF 107 which is able to handle the CS authentication procedure. The S-CSCF 107 contacts the IWF 109 instead the IBS. This means step B6 and step B7 of FIG. 2 are not executed.

As another variation the I-CSCF 105 detects the inbound roamer as described above and queries the IWF 109 (step B6) which may look up a database whether the MNC/MCC operator network has an IMS roaming agreement or not. If there is no IMS roaming agreement or any other related Service Level Agreements (SLA) in place with this network, then the IWF 109 selects an S-CSCT 107 which is able to handle the CS authentication procedure (step B7) and provides the S-CSCF address to the I-CSCF 105. Detailed description is made as follows with reference to FIG. 2.

B1. The UE 101 sends a Location Update Request towards CS network.

B2-B3. Upon receipt of the Location Update Request, the MSC Server enhanced for SeDoC 103 performs standard identity request if needed.

B4. The MSC Server enhanced for SeDoC 103 decides to initiate IMS registration for this subscriber and derives a domain name from the subscriber's identity (e.g. IMSI) and discovers the address of the appropriate I-CSCF/IBCF.

B5-B8. The I-CSCF 105 verifies that the incoming REGISTER origins from a trusted MSC Server (in the same way it would check that a normal REGISTER origins from a trusted P-CSCF). The I-CSCF 105 detects the inbound roaming UE 101 based on a comparison of the MNC/MCC in the IMPI/IMPU. The I-CSCF 105 queries the IWF 109 which may look up a database whether the MNC/MCC operator network (HPLMN of the inbound roaming UE 101) has an IMS roaming agreement or not.

If there is no IMS roaming agreement or any other relates Service Level Agreements (SLA) in place with this network, then the IWF 109 selects an S-CSCF 107 which is able to handle the CS authentication procedure and provides the S-CSCF address to the I-CSCF 105. The I-CSCF 105 marks the SIP REGISTER with an inbound roaming indication towards the S-CSCF 107.

B9. The S-CSCF 107 identifies the REGISTER as being from the MSC Server enhanced for SeDoC 103, and is for an inbound roaming UE without IMS roaming agreement, so that the S-CSCF 107 selects the IWF 109 instead of the HSS. The S-CSCF 107 requests the Authentication Info from the IWF 109 which acts as a HSS towards the S-CSCF 107.

During these procedures, authentication parameters for a given subscriber are carried. The parameters contain an Authentication Quintuplet (Rand, Xres, Ck, Ik, Autn).

B10-B14. The IWF 109 acting as VLR retrieves the Authentication Info parameters from the HLR 301. The IFW 109 retrieves the service profile via the D interface, i.e. it behaves like a VLR towards the HPLMN HLR 301 by performing an Update Location Procedure and an Insert Subscriber Data Procedure. The IWF 109 creates a temporary record (subscription profile). For invoking other AS(s), the IWF 109 generates the corresponding IFC(s). The IWF 109 provides the authentication vector to the S-CSCF 107.

B15-B16. The S-CSCF 107 sends a SIP 401 i.e. an authentication challenge towards the UE 101 including the challenge RAND, the authentication token AUTN, and also the integrity key IK and the cipher key CK to the MSC Server enhanced for SeDoC 103.

B17. Upon receipt of SIP 401 from IMS, the MSC Server enhanced for SeDoC 103 initiates the authentication procedure by transferring an AUTHENTICATION REQUEST message across the radio interface. The AUTHENTICATION REQUEST message contains the parameters necessary to calculate the response parameters.

B18. The UE 101 processes the challenge information and sends back an AUTHENTICATION RESPONSE message to the network.

B19. The MSC Server enhanced for SeDoC 103 should send REGISTER with authentication result (XRES) to the I-CSCF 105.

B20-B26. The I-CSCF 105 forwards the authentication response to the S-CSCF 107. Upon receiving the message, the S-CSCF 107 checks the authentication response sent by the UE 101. If the user has been successfully authenticated, the S-CSCF 107 sends SIP 200 OK to the MSC Server enhanced for SeDoC 103 via the I-CSCF 105.

B27. On receiving a SIP 200 (OK) response to the REGISTER request, the MSC Server enhanced for SeDoC 103 generates a TMSI for the UE 101 and sends Location Update Accept towards the UE 101.

Embodiment #1b

In this embodiment, the MSC server enhanced for SeDoC 103 performs a normal SIP REGISTER message with the IMPU/IMPI generated as described above according to TS 23.003. The I-CSCF 105 is querying the HSS according to the normal procedures and the HSS detects the inbound roaming UE 101 based on a comparison of the MNC/MCC in the IMPI/IMPU. The HSS may look up a database whether the MNC/MCC operator network (HPLMN 300 of the inbound roaming UE 101) has an IMS roaming agreement or not. If there is no IMS roaming agreement or any other related Service Level Agreements (SLA) in place with this network, then the HSS provides an inbound roamer indication in the Cx-Query-Response and selects an S-CSCF 107 which is able to handle the CS authentication procedure and provides the S-CSCF address to the I-CSCF 105. The I-CSCF 105 marks the SIP REGISTER with an inbound roamer indication so that the S-CSCF 107 contacts the IWF 109 instead the HSS. Detailed description will be made as follows with reference to FIG. 3.

C1. The UE 101 sends a Location Update Request towards CS network.

C2-C3. Upon receipt of the Location Update Request, a MSC Server enhanced for SeDoC 103 performs standard identity request if needed.

C4. The MSC Server enhanced for SeDoC 103 decides to initiate IMS registration for this subscriber and derives a domain name from the subscriber's identity (e.g. IMI) and discovers the address of the appropriate I-CSCF/IBCF.

C5-C8. The I-CSCF 105 verifies that the incoming REGISTER origins from a trusted MSC Server (in the same way it would check that a normal REGISTER origins from a trusted P-CSCF). The I-CSCF 105 initiates standard procedures for S-CSCF 107 location/allocation and queries the HSS 111 which detects the inbound roaming UE 101 based on a comparison of the MNC/MCC in the IMPI/IMPU.

The HSS 111 may look up a database whether the MNC/MCC operator network (HPLMN of the inbound roaming UE 101) has an IMS roaming agreement or not. If there is no IMS roaming agreement or any other relates Service Level Agreements (SLA) in place with this network, then the HSS 111 selects an S-CSCF 107 which is able to handle the CS authentication procedure. The HSS 111 provides the S-CSCF address and an inbound roaming indication to the I-CSCF 105. The I-CSCF 105 marks the SIP REGISTER with an inbound roaming indication towards the S-CSCF 107.

C9. The S-CSCF 107 identifies the REGISTER as being from the MSC Server enhanced for SeDoC 103, and is for an inbound roaming UE without IMS roaming agreement, so that the S-CSCF 107 selects the IWF 109 instead of the HSS 111. The S-CSCF 107 requests the Authentication Info from the IWF 109 which acts as a HSS towards the S-CSCF 107.

During these procedures, authentication parameters for a given subscriber are carried. The parameters contain an Authentication Quintuplet (Rand, Xres, Ck, Ik, Autn).

C10-C14. The IWF 109 acting as VLR retrieves the Authentication Info parameters from the HLR 301. The IWF 109 retrieves the service profile via the D interface, i.e. it behaves like a VLR towards the HPLMN HLR 301 by performing an Update Location Procedure and an Insert Subscriber Data Procedure. The IWF 109 creates a temporary record (subscription profile). For invoking other AS(s), the IWF 109 generates the corresponding iFC(s). The IWF 109 provides the authentication vector to the S-CSCF 107.

C15-C16. The S-CSCF 107 sends a SIP 401 i.e. an authentication challenge towards the UE 101 including the challenge RAND, the authentication token AUTN, and also the integrity key IK and the cipher key CK to the MSC Server enhanced for SeDoC 103.

C17. Upon receipt of SIP 401 from IMS, the MSC Server enhanced for SeDoC 103 initiates the authentication procedure by transferring an AUTHENTICATION REQUEST message across the radio interface. The AUTHENTICATION REQUEST message contains the parameters necessary to calculate the response parameters.

C18. The UE 101 processes the challenge information and sends back an AUTHENTICATION RESPONSE message to the network.

C19. The MSC Server enhanced for SeDoC 103 should send REGISTER with authentication result (XRES) to the I-CSCF 105.

C20-C26. The I-CSCF 105 forwards the authentication response to the S-CSCF 107. Upon receiving the message, the S-CSCF 107 checks the authentication response sent by the UE 101. If the user has been successfully authenticated, the S-CSCF 107 sends SIP 200 OK to the MSC Server enhanced for SeDoC 103 via the I-CSCF 105.

C27. On receiving a SIP 200 (OK) response to the REGISTER request, the MSC Server enhanced for SeDoC 103 generates a TMSI for the UE 101 and sends Location Update Accept towards the UE 101.

Embodiment #2: Explicit Inbound Roamer Indication in SIP REGISTER Message

In this embodiment, the MSC server enhanced for SeDoC 103 detects already based on the IMSI provided by the inbound roaming UE 101 that it doesn't belong to the own network. The MSC server enhanced for SeDoC 103 may look up a database whether the MNC/MCC operator network (HPLMN of the inbound roaming UE 101) has an IMS roaming agreement or not. If there is no IMS roaming agreement or any other related Service Level Agreements (SLA) in place with this network, then the MSC server enhanced for SeDoC 103 marks the SIP REGISTER with an indication that it is an inbound roamer and uses in addition the IMPU/IMPI generated as described above according to TS 23.003. The I-CSCF 105 detects the inbound roaming UE 101 based on the indication in the SIP REGISTER. The I-CSCF 105 queries the IWF 109 instead of the HSS, which selects an S-CSCF which is able to handle the CS authentication procedure and provides the S-CSCF address to the I-CSCF 105. The I-CSCF 105 forwards the SIP REGISTER with the inbound roaming indication to the S-CSCF 107, which now contacts the IWF 109 instead the HSS.

This embodiment may have different variations, e.g. that the MSC server only marks the SIP REGISTER that is it an inbound roamer but the detection of the missing IMS roaming agreement is done as in Embodiment #1a in the I-CSCF or as in Embodiment #1b in the HSS respectively.

Detailed description is made as follows with reference to FIG. 4.

D1. The UE 101 sends a Location Update Request towards CS network.

D2-D3. Upon receipt of the Location Update Request, a MSC Server enhanced for SeDoC 103 performs standard identity request if needed.

D4. The MSC Server enhanced for SeDoC 103 decides to initiate IMS registration for this subscriber and derives a domain name from the subscriber's identity (e.g. IMSI) and discovers the address of the appropriate I-CSCF/IBCF. The MSC server enhanced for SeDoC 103 detects already based on the IMSI provided by the inbound roaming UE 101 that it doesn't belong to the own network and marks the SIP REGISTER with an inbound roaming indication.

D5-D8. The I-CSCF 105 verifies that the incoming REGISTER origins from a trusted MSC Server (in the same way it would check that a normal REGISTER origins from a trusted P-CSCF). The I-CSCF 105 initiates standard procedures for S-CSCF location/allocation and queries the IWF 109 based on the inbound roaming indication. The IWF 109 may look up a database whether the MNC/MCC operator network (HPLMN of the inbound roaming UE 101) has an IMS roaming agreement or not. If there is no IMS roaming agreement or any other relates Service Level Agreements (SLA) in place with this network, then the IWF 109 selects an S-CSCF which is able to handle the CS authentication procedure. The IWF 109 provides the S-CSCF address and an inbound roaming indication to the I-CSCF 105. The I-CSCF 105 marks the SIP REGISTER with an inbound roaming indication towards the S-CSCF 107.

D9. The S-CSCF 107 identifies the REGISTER as being from the MSC Server enhanced for SeDoC 103, and is for an inbound roaming UE without IMS roaming agreement, so that the S-CSCF 107 selects the IWF 109 instead of the HSS. The S-CSCF 107 requests the Authentication info from the IWF 109 which acts as a HSS towards the S-CSCF 107.

During these procedures, authentication parameters for a given subscriber are carried. The parameters contain an Authentication Quintuplet (Rand, Xres, Ck, Ik, Autn).

D10-D14. The IWF 109 acting as VLR retrieves the Authentication Info parameters from the HLR 301. The IWF 109 retrieves the service profile via the D interface, i.e. it behaves like a VLR towards the HPLMN HLR 301 by performing an Update Location Procedure and an Insert Subscriber Data Procedure. The IWF 109 creates a temporary record (subscription profile). For invoking other AS(s), the IWF 109 generates the corresponding iFC(s). The IWF 109 provides the authentication vector to the S-CSCF 107.

D15-D16. The S-CSCF 107 sends a SIP 401 i.e. an authentication challenge towards the UE 101 including the challenge RAND, the authentication token AUTN, and also the integrity key IK and the cipher key CK to the MSC Server enhanced for SeDoC 103.

D17. Upon receipt of SIP 401 from IMS, the MSC Server enhanced for SeDoC 103 initiates the authentication procedure by transferring an AUTHENTICATION REQUEST message across the radio interface. The AUTHENTICATION REQUEST message contains the parameters necessary to calculate the response parameters.

D18. The UE 101 processes the challenge information and sends back an AUTHENTICATION RESPONSE message to the network.

D19. The MSC Server enhanced for SeDoC 103 should send REGISTER with authentication result (XRES) to the I-CSCF 105.

D20-26. The I-CSCF 105 forwards the authentication response to the S-CSCF 107. Upon receiving the message, the S-CSCF 107 checks the authentication response sent by the UE 101. If the user has been successfully authenticated, the S-CSCF 107 sends SIP 200 OK to the MSC Server enhanced for SeDoC 103 via the I-CSCF 105.

D27. On receiving a SIP 200 (OK) response to the REGISTER request, the MSC Server enhanced for SeDoC 103 generates a TMSI for the UE 101 and sends Location Update Accept towards the UE 101.

Embodiment #3: Inbound Roamer Detection Based on SLF Query

In this embodiment, the MSC server enhanced for SeDoC 103 performs a normal SIP REGISTER message with the IMPU/IMPI generated as described above according to Ts 23.003. The I-CSCF 105 queries the SLF 113 according to the normal procedures described in TS 23.228 and the SLF 113 detects the inbound roaming UE 101 based on a comparison of the MNC/MCC in the IMPI/IMPU. The SLF 113 may look up a database whether the MNC/MCC operator network (HPLMN of the inbound roaming UE 101) has an IMS roaming agreement or not. If there is no IMS roaming agreement or any other relates Service Level Agreements (SLA) in place with this network, then the SLF 113 provides an inbound roamer indication in the Dx_SLF_Response with the IWF address or the selected S-CSCF address. The I-CSCF 105 would now either query the IWF 109 according to Embodiment #2 and the IWF 109 would select an S-CSCF which is able to handle the CS authentication procedure and provide the S-CSCF address to the I-CSCF 105, or, the I-CSCF 105 retrieves the S-CSCF address directly from the SLF 113 and sends the SIP REGISTER to the S-CSCF 107. The I-CSCF 105 marks the SIP REGISTER with an inbound roamer indication so that the S-CSCF 107 contacts the IWF 109 instead the HSS. Detailed description is made as follows with reference to FIG. 5.

E1. The UE 101 sends a Location Update Request towards CS network.

E2-E3. Upon receipt of the Location Update Request, a MSC Server enhanced for SeDoC 103 performs standard identity request if needed.

E4. The MSC Server enhanced for SeDoC 103 decides to initiate IMS registration for this subscriber and derives a domain name from the subscriber's identity (e.g. IMSI) and discovers the address of the appropriate I-CSCF/IBCF.

E5-E8. The I-CSCF 105 verifies that the incoming REGISTER origins from a trusted MSC Server (in the same way it would check that a normal REGISTER origins from a trusted P-CSCF). The I-CSCF 105 initiates standard procedures for S-CSCF location/allocation and queries the SLF 113 which detects the inbound roaming UE 101 based on a comparison of the MNC/MCC in the IMPI/IMPU. The SLF 113 may look up a database whether the MNC/MCC, operator network (HPLMN of the inbound roaming UE 101) has an IMS roaming agreement or not. If there is no IMS roaming agreement or any other relates Service Level Agreements (SLA) in place with this network. The SLF 113 may provide the ICS-IWF address to the I-CSCF 105, or directly the S-CSCF address. If not allocated by the SLF 113, the I-CSCF 105 queries the IWF 109 which selects an S-CSCF which is able to handle the CS authentication procedure. The IWF 109 provides the S-CSCF address and an inbound roaming indication to the I-CSCF 105. The I-CSCF 105 marks the SIP REGISTER with an inbound roaming indication towards the S-CSCF 107.

E9. The S-CSCF 107 identifies the REGISTER as being from the MSC Server enhanced for SeDoC 103, and is for an inbound roaming UE without IMS roaming agreement, so that the S-CSCF 107 selects the IWF 109 instead of the HSS. The S-CSCF 107 requests the Authentication Info from the IWF 109 which acts as a HSS towards the S-CSCF 107.

During these procedures, authentication parameters for a given subscriber are carried. The parameters contain an Authentication Quintuplet (Rand, Xres, Ck, Ik, Autn).

E10-E14. The IWF 109 acting as VLR retrieves the Authentication Info parameters from the HLR 301. The IWF 109 retrieves the service profile via the D interface, i.e. it behaves like a VLR towards the HPLMN HLR 301 by performing an Update Location Procedure and an Insert Subscriber Data Procedure. The IWF 109 creates a temporary record (subscription profile). For invoking other AS(s), the IWF 109 generates the corresponding iFC(s). The IWF 109 provides the authentication vector to the S-CSCF 107.

E15-E16. The S-CSCF 107 sends a SIP 401 i.e. an authentication challenge towards the UE 101 including the challenge RAND, the authentication token AUTN, and also the integrity key IK and the cipher key CK to the MSC Server enhanced for SeDoC 103.

E17. Upon receipt of SIP 401 from IMS, the MSC Server enhanced for SeDoC 103 initiates the authentication procedure by transferring an AUTHENTICATION REQUEST message across the radio interface. The AUTHENTICATION REQUEST message contains the parameters necessary to calculate the response parameters.

E18. The UE 101 processes the challenge information and sends back an AUTHENTICATION RESPONSE message to the network.

E19. The MSC Server enhanced far SeDoC 103 should send REGISTER with authentication result (XRES) to the I-CSCF 105.

E20-E26. The I-CSCF 105 forwards the authentication response to the S-CSCF 107. Upon receiving the message, the S-CSCF 107 checks the authentication response sent by the UE 101. If the user has been successfully authenticated, the S-CSCF 107 sends SIP 200 OK to the MSC Server enhanced for SeDoC 103 via the I-CSCF 105.

E27. On receiving a SIP 200 (OK) response to the REGISTER request, the MSC Server enhanced for SeDoC 103 generates a TMSI for the UE 101 and sends Location Update Accept towards the UE 101.

<Advantages Include:>

1) Detection of inbound roaming UEs and its IMS roaming agreement in the MSC server, the I-CSCF, HSS, SLF or ICS-IWF 2) Selection of an S-CSCF capable to handle CS authentication over IMS AKA procedure.

3) Marking of the SIP REGISTER with an inbound roaming indication towards the S-CSCF so that the S-CSCF selects the ICS-IWF instead of the HSS.

4) The I-CSCF and the S-CSCF can select the subscriber database.

<User Equipment (UE)>

FIG. 6 is a block diagram illustrating the main components of the UE 101. As shown, the UE 101 includes a transceiver circuit 101A which is operable to transmit signals to and to receive signals from the connected node(s) via one or more antenna 101B. Although not necessarily shown in FIG. 6, the UE 101 will of course have all the usual functionality of a conventional mobile device (such as a user interface 101C) and this may be provided by any one or any combination of hardware, software and firmware, as appropriate. Software may be pre-installed in a memory 101D and/or may be downloaded via the telecommunication network or from a removable data storage device (RMD), for example. A controller 101E controls the operation of the UE 101 in accordance with software stored in the memory 101D. The software includes, among other things, an operating system 101F and a communications control module 101G having at least a transceiver control module 101H. The communications control module 101G (using its transceiver control sub-module 101H) is responsible for handling (generating/sending/receiving) signalling and uplink/downlink data packets between the UE 101 and other nodes, such as a base station/radio access node (RAN node 303) and the MSC server 103 and other nodes (e.g. via a RAN node 303).

<MSC Server>

FIG. 7 is a block diagram illustrating the main components of an exemplary MSC Server 103. As shown, the MSC Server 103 includes a transceiver circuit 103A which is operable to transmit signals to and to receive signals from other nodes connected to the MSC Server 103 (such as the UE 101 (e.g. via a RAN node 303) and I-CSCF 105) via a network interface 103B. A controller 103C controls the operation of the MSC Server 103 in accordance with software stored in a memory 103D. Software may be pre-installed in the memory 103D and/or may be downloaded via the telecommunication network or from a removable data storage device (RMD), for example. The software includes, among other things, an operating system 103E and a communications control module 103F having at least a transceiver control module 103G. The communications control module 103F (using its transceiver control sub-module 103G) is responsible for handling (generating/sending/receiving) signalling between the MSC Server 103 and other network nodes (such as the UE 101 (e.g. via a RAN node 303) and the I-CSCF 105).

<I-CSCF>

FIG. 8 is a block diagram illustrating the main components of the I-CSCF 105. As shown, the I-CSCF 105 includes a transceiver circuit 105A which is operable to transmit signals to and to receive signals from other nodes (including the UE) via a network interface 105B. A controller 105C controls the operation of the I-CSCF 105 in accordance with software stored in a memory 105D. Software may be pre-installed in the memory 105D and/or may be downloaded via the telecommunication network or from a removable data storage device (RMD), for example. The software includes, among other things, an operating system 105E and a communications control module 105E having at least a transceiver control module 105G. The communications control module 105F (using its transceiver control sub-module 105G) is responsible for handling (generating/sending/receiving) signalling between the I-CSCF 105 and other nodes (such as the MSC Server 103 and the S-CSCF 107).

<S-CSCF>

FIG. 9 is a block diagram illustrating the main components of the S-CSCF 107. As shown, the S-CSCF 107 includes a transceiver circuit 107A which is operable to transmit signals to and to receive signals from other nodes (including the UE, SMF etc.) via a network interface 107B. A controller 107C controls the operation of the S-CSCF 107 in accordance with software stored in a memory 107D. Software may be pre-installed in the memory 107D and/or may be downloaded via the telecommunication network or from a removable data storage device (RMD), for example. The software includes, among other things, an operating system 107E and a communications control module 107F having at least a transceiver control module 107G. The communications control module 107F (using its transceiver control sub-module 107G) is responsible for handling (generating/sending/receiving) signalling between the S-CSCF 107 and other nodes (such as the I-CSCF 105 and the IWF 109).

<IWF>

FIG. 10 is a block diagram illustrating the main components of the IWF 109. As shown, the IWF 109 includes a transceiver circuit 109A which is operable to transmit signals to and to receive signals from other nodes (including the UE, SMF etc.) via a network interface 109B. A controller 109C controls the operation of the IWF 109 in accordance with software stored in a memory 109D. Software may be pre-installed in the memory 109D and/or may be downloaded via the telecommunication network or from a removable data storage device (RMD), for example. The software includes, among other things, an operating system 109E and a communications control module 109F having at least a transceiver control module 109G. The communications control module 109F (using its transceiver control sub-module 109G) is responsible for handling (generating/sending/receiving) signalling between the IWF 109 and other nodes (such as the S-CSCF 107 and the HLR 301).

<HLR>

FIG. 11 is a block diagram illustrating the main components of the HLR 301. As shown, the HLR 301 includes a transceiver circuit 301A which is operable to transmit signals to and to receive signals from other nodes (including the UE, SMF etc.) via a network interface 301B. A controller 301C controls the operation of the HLR 301 in accordance with software stored in a memory 301D. Software may be pre-installed in the memory 301D and/or may be downloaded via the telecommunication network or from a removable data storage device (RMD), for example. The software includes, among other things, an operating system 301E and a communications control module 301F having at least a transceiver control module 301G. The communications control module 301E (using its transceiver control sub-module 301G) is responsible for handling (generating/sending/receiving) signalling between the HLR 301 and other nodes (such as the IWF 109 of the VPLN and one or more other nodes of the HPLMN 300).

<RAN Node>

FIG. 12 is a block diagram illustrating the main components of an exemplary RAN node 303. As shown, the RAN node 303 includes a transceiver circuit 303A which is operable to transmit signals to and to receive signals from connected UE(s) via one or more antenna 303B and to transmit signals to and to receive signals from other network nodes (either directly or indirectly) via a network interface 303C. A controller 303D controls the operation of the RAN node 303 in accordance with software stored in a memory 303E. Software may be pre-installed in the memory 303E and/or may be downloaded via the telecommunication network or from a removable data storage device (RMD), for example. The software includes, among other things, an operating system 303F and a communications control module 303G having at least a transceiver control module 303H. The communications control module 303G (using its transceiver control sub-module 303H) is responsible for handling (generating/sending/receiving) signalling between the RAN node 303 and other nodes, such as the UE 101, the MSC Server 103, and the other nodes of the VPLMN 100 (e.g. indirectly).

<Modifications and Alternatives>

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above description, the UE, the MSC Server, the I-CSCF, the S-CSCF, the IWF, the HLR, and the RAN Node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the MSC Server, the I-CSCF, the S-CSCF, the IWF, the HLR, and the RAN Node as a signal over a computer network, or on a recording medium. Further, the functionality performed by part or all of this software may be performed using one or more dedicated hardware circuits. However, the use of software modules is preferred as it facilitates the updating of the UE, the MSC Server, the I-CSCF, the S-CSCF, the IWF, the HLR, and the RAN Node in order to update their functionalities.

LIST OF REFERENCES

[1] 3GPP TS 23.228, IP Multimedia Subsystem (IMS); Stage 2, v14.1.0, 2016 Sep. 26
[2] 3GPP TS 23.292, IP Multimedia Subsystem (IMS) centralized services; Stage 2, v14.0.0, 2016 Sep. 26
[3] 3GPP TS 23.003, Numbering, addressing and identification, v14.1.0 2016 Sep. 26

This application is based upon and claims the benefit of priority from European Patent application No. EP 16275177.0, filed on Dec. 21, 2016, the disclosure of which is incorporated herein in its entirety by reference.

The invention claimed is:

1. An Interrogating Call Session Control Function (I-CSCF) entity, comprising:
 a receiver configured to receive a register message with an Internet Protocol (IP) Multimedia Private Identity (IMPI) of a User Equipment (UE) from a Mobile Switching Centre (MSC) server enhanced for Service Domain Centralization in IP Multimedia Subsystem (IMS) (SeDoC); and
 at least one processor configured to process to:
  detect the UE is an inbound roaming UE, based on a comparison of a Mobile Network Code (MNC) and Mobile Country Code (MCC) included in the IMPI, and
  query an IMS Centralized Services (ICS) Interworking Function (ICS-IWF) entity whether an operator network indicated by the MNC and MCC has an IMS roaming agreement, wherein
 the I-CSCF entity further includes:
  a further receiver configured to receive an address of a Serving Call Session Control Function (S-CSCF) entity which handles a Circuit Switched (CS) authentication procedure in a case that there is no IMS roaming agreement or a Service Level Agreement in place with a network including the I-CSCF entity; and
  a transmitter configured to forward the register message with an indication that the register message is for the inbound roaming UE, towards the S-CSCF entity.

2. An Internet Protocol (IP) Multimedia Subsystem (IMS) Centralized Services (ICS) Interworking Function (ICS-IWF) entity, comprising:
    a receiver configured to receive from an Interrogating Call Session Control Function (I-CSCF) entity, a query whether an operator network indicated by a MNC and MCC included in an IP Multimedia Private Identity (IMPI) with a registration message received by the I-CSCF entity has an IMS roaming agreement; and
    at least one processor configured to process to:
        select a Serving Call Session Control Function (S-CSCF) entity which handles Circuit Switched (CS) authentication procedure in a case that there is no IMS roaming agreement or a Service Level Agreement (SLA) in place with a network including the ICS-IWF, and
        provide an address of the S-CSCF entity to the I-CSCF entity.

3. A communication system for Internet Protocol (IP) Multimedia Subsystem (IMS) Centralized Services (ICS), comprising:
    an Interrogating Call Session Control Function (I-CSCF) entity and an ICS Interworking Function (ICS-IWF) entity, wherein
    the I-CSCF entity includes:
        a receiver configured to receive a register message with an IP Multimedia Private Identity (IMPI) of a User Equipment (UE) from a Mobile Switching Centre (MSC) server enhanced for Service Domain Centralization in IP Multimedia Subsystem (SeDoC); and
        at least one processor configured to process to:
            detect the UE is an inbound roaming UE, based on a comparison of a Mobile Network Code (MNC) and Mobile Country Code (MCC) included in the IMPI, and
            query the ICS-IWF entity whether an operator network indicated by the MNC and MCC has an IMS roaming agreement, based on detection of the inbound roaming UE, and
    the ICS-IWF entity includes:
        at least one processor configured to process to:
            select a Serving Call Session Control Function, S-CSCF, entity which handles Circuit Switched (CS) authentication procedure, in a case that there is no IMS roaming agreement or a Service Level Agreement, SLA, in place with a network including the ICS-IWF entity, and
            provide an address of the S-CSCF entity to the I-CSCF entity, and the I-CSCF entity further includes:
    a transmitter configured to forward the register message with an indication that the register message is for the inbound roaming UE, towards the S-CSCF entity.

4. A controlling method used for an Interrogating Call Session Control Function (I-CSCF) entity, comprising:
    receiving a register message with an Internet Protocol (IP) Multimedia Private Identity (IMPI) of a User Equipment (UE) from a Mobile Switching Centre (MSC) server enhanced for Service Domain Centralization in IP Multimedia Subsystem (IMS) (SeDoC);
    detecting the UE is an inbound roaming UE, based on a comparison of a Mobile Network Code (MNC) and Mobile Country Code (MCC) included in the IMPI;
    querying an IMS Centralized Services (ICS) Interworking Function (ICS-IWF) entity whether an operator network indicated by the MNC and MCC has an IMS roaming agreement;
    receiving an address of a Serving Call Session Control Function (S-CSCF) entity which handles Circuit Switched (CS) authentication procedure in a case that there is no IMS roaming agreement or a Service Level Agreement in place with a network including the I-CSCF entity; and
    forwarding the register message with an indication that the register message is for the inbound roaming UE, towards the S-CSCF entity.

5. A controlling method used for an Internet Protocol (IP) Multimedia Subsystem (IMS) Centralized Services (ICS) Interworking Function (ICS-IWF) entity, comprising:
    receiving from an Interrogating Call Session Control Function (I-CSCF) entity, a query whether an operator network indicated by a MNC and MCC included in an IP Multimedia Private Identity (IMPI) with a registration message received by the I-CSCF entity has an IMS roaming agreement;
    selecting a Serving Call Session Control Function (S-CSCF) entity which handles Circuit Switched (CS) authentication procedure, in a case that there is no IMS roaming agreement or a Service Level Agreement (SLA) in place with a network including the ICS-IWF entity; and
    providing an address of the S-CSCF entity to the I-CSCF entity.

6. A controlling method used for a communication system for Internet Protocol (IP) Multimedia Subsystem (IMS) Centralized Services (ICS), comprising:
    receiving, by an Interrogating Call Session Control Function (I-CSCF) entity in the communication system, a register message with an IP Multimedia Private Identity (IMPI) of a User Equipment (UE) from a Mobile Switching Centre (MSC) server enhanced for Service Domain Centralization in IP Multimedia Subsystem (SeDoC);
    detecting, by the I-CSCF entity, the UE is an inbound roaming UE, based on a comparison of a Mobile Network Code (MNC) and Mobile Country Code (MCC) included in the IMPI;
    querying, by the I-CSCF entity, an ICS Interworking Function (ICS-IWF) entity in the communication system whether an operator network indicated by the MNC and MCC has an IMS roaming agreement, based on detection of the inbound roaming UE;
    selecting, by the ICS-IWF entity, a Serving Call Session Control Function (S-CSCF) entity which handles Circuit Switched (CS) authentication procedure, in a case that there is no IMS roaming agreement or a Service Level Agreement (SLA) in place with a network including the ICS-IWF entity;
    providing, by the ICS-IWF entity, an address of the S-CSCF entity to the I-CSCF entity; and
    forwarding, by the I-CSCF entity, the register message with an indication that the register message is for the inbound roaming UE, towards the S-CSCF entity.

* * * * *